(12) United States Patent
Koshoffer

(10) Patent No.: US 6,883,302 B2
(45) Date of Patent: Apr. 26, 2005

(54) METHODS AND APPARATUS FOR GENERATING GAS TURBINE ENGINE THRUST WITH A PULSE DETONATION THRUST AUGMENTER

(75) Inventor: John Michael Koshoffer, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 10 days.

(21) Appl. No.: 10/326,343

(22) Filed: Dec. 20, 2002

(65) Prior Publication Data

US 2004/0118104 A1 Jun. 24, 2004

(51) Int. Cl.[7] ............................. F02K 7/02; F02K 7/075; F02K 3/10; F02K 3/105
(52) U.S. Cl. ............................. 60/204; 60/247; 60/761; 60/762
(58) Field of Search ........................ 60/204, 225, 226.1, 60/247, 761, 762, 39.38, 39.39, 39.76

(56) References Cited

U.S. PATENT DOCUMENTS

| | | | | |
|---|---|---|---|---|
| 2,635,420 A | * | 4/1953 | Jonker | 60/226.1 |
| 2,705,396 A | * | 4/1955 | Boyce et al. | 60/247 |
| 3,726,091 A | * | 4/1973 | Tontini | 60/264 |
| 3,916,621 A | * | 11/1975 | Amenta | 60/247 |
| 4,312,185 A | * | 1/1982 | Nash et al. | 60/262 |
| 5,076,053 A | * | 12/1991 | McVey et al. | 60/765 |
| 5,513,489 A | | 5/1996 | Bussing | |
| 5,694,768 A | | 12/1997 | Johnson et al. | |
| 5,873,240 A | | 2/1999 | Bussing et al. | |
| 5,937,635 A | * | 8/1999 | Winfree et al. | 60/39.38 |
| 6,003,301 A | * | 12/1999 | Bratkovich et al. | 60/247 |
| 6,442,930 B1 | * | 9/2002 | Johnson et al. | 60/226.1 |
| 6,477,829 B1 | * | 11/2002 | Hunter et al. | 60/247 |
| 6,550,235 B1 | * | 4/2003 | Johnson et al. | 60/204 |
| 6,637,187 B1 | * | 10/2003 | Sanders et al. | 60/247 |
| 6,666,018 B1 | * | 12/2003 | Butler et al. | 60/226.1 |

FOREIGN PATENT DOCUMENTS

WO    WO87/06976    11/1987

* cited by examiner

*Primary Examiner*—Ted Kim
(74) *Attorney, Agent, or Firm*—William Scott Andes; Armstrong Teasdale LLP

(57) ABSTRACT

A method enables thrust to be generated from a gas turbine engine using a pulse detonation system is provided. The engine includes an inlet portion and an exhaust portion, and the pulse detonation system includes a multi-staged pulse detonation augmentor including predetonator. The method comprises supplying a less than stoichiometric fuel/air mixture to the pulse detonation system during a first operating stage, detonating the fuel/air mixture with the predetonator to increase the temperature and pressure within the engine and to generate engine thrust, and supplying additional fuel and air to the pulse detonation system during a second operating stage.

20 Claims, 2 Drawing Sheets

METHODS AND APPARATUS FOR GENERATING GAS TURBINE ENGINE THRUST WITH A PULSE DETONATION THRUST AUGMENTER

BACKGROUND OF THE INVENTION

This invention relates to gas turbine engines, and more particularly, to a pulse detonation system for a gas turbine engine.

Variable cycle turbofan ramjet engines may be used to provide aircraft flight speeds between low subsonic Mach numbers to high supersonic Mach numbers of about Mach 6. Known engines, as described in U.S. Pat. No. 5,694,768, include a core engine system and a dual mode augmentor. The dual mode augmentor provides additional heat to exhaust airflow exiting the core engine system to increase engine thrust. The core engine system provides power to drive a fan assembly and typically includes in serial, axial flow relationship, a compressor, a combustor, a high pressure turbine, and a low pressure turbine. The dual mode augmentor is positioned downstream from the core engine and receives air from the core engine and a bypass duct surrounding the core engine. However, augmentors are limited to a level of thrust increase by stoichiometry, and as a result, for an engine to operate efficiently over a wide range of operating flight speeds, several different combustion systems may be required.

To facilitate optimizing thrust production, at least some known engines include pulse detonation systems which replace a conventional augmentor on a turbofan or turbojet engine, and which utilize a deflagration process and a detonation process. The deflagration process is implemented using a plurality of mechanical valving. However, the performance of such systems is generally limited because of inherent deficiencies that may exist because the deflagration process consumes energy without the benefit of detonation, which occurs only on the remainder of any unconsumed fuel. Additionally, any benefits gained from using such pulse detonation systems, may be offset by an overall weight of the system.

BRIEF SUMMARY OF THE INVENTION

In one aspect, a method for generating thrust from a gas turbine engine using a pulse detonation system is provided. The engine includes an inlet portion and an exhaust portion, and the pulse detonation system includes an pulse detonation augmentor including a multi-staged predetonator. The method comprises supplying a less than stoichiometric fuel/air mixture to the pulse detonation system during a first operating stage, detonating the fuel/air mixture with the predetonator to increase the temperature and pressure within the engine and to generate engine thrust, and supplying additional fuel and air to the predetonator during a second operating stage.

In another aspect of the invention, a pulse detonation system for a gas turbine engine including a core engine is provided. The pulse detonation system is downstream from the core engine and is configured to create a temperature rise and a pressure rise within the gas turbine engine and to increase engine thrust. The pulse detonation system includes a pulse detonation augmentor including a multi-staged predetonator that is operable with at least a first operating stage wherein a less-than-stoichiometric fuel-air mixture is provided to the predetonator.

In yet a further aspect, a gas turbine engine is provided. The engine includes an inlet portion, an exhaust portion that is positioned co-axially with the inlet portion, and a pulse detonation system that is positioned between the inlet and exhaust portions. The pulse detonation system is configured to create a temperature rise and a pressure rise within the engine and to increase engine thrust. The pulse detonation system includes a pulse detonation augmentor including a multi-staged predetonator that is operable with at least a first operating stage wherein a less-than-stoichiometric fuel-air mixture is provided to the predetonator.

DETAILED DESCRIPTION OF THE INVENTION

Figure 1:
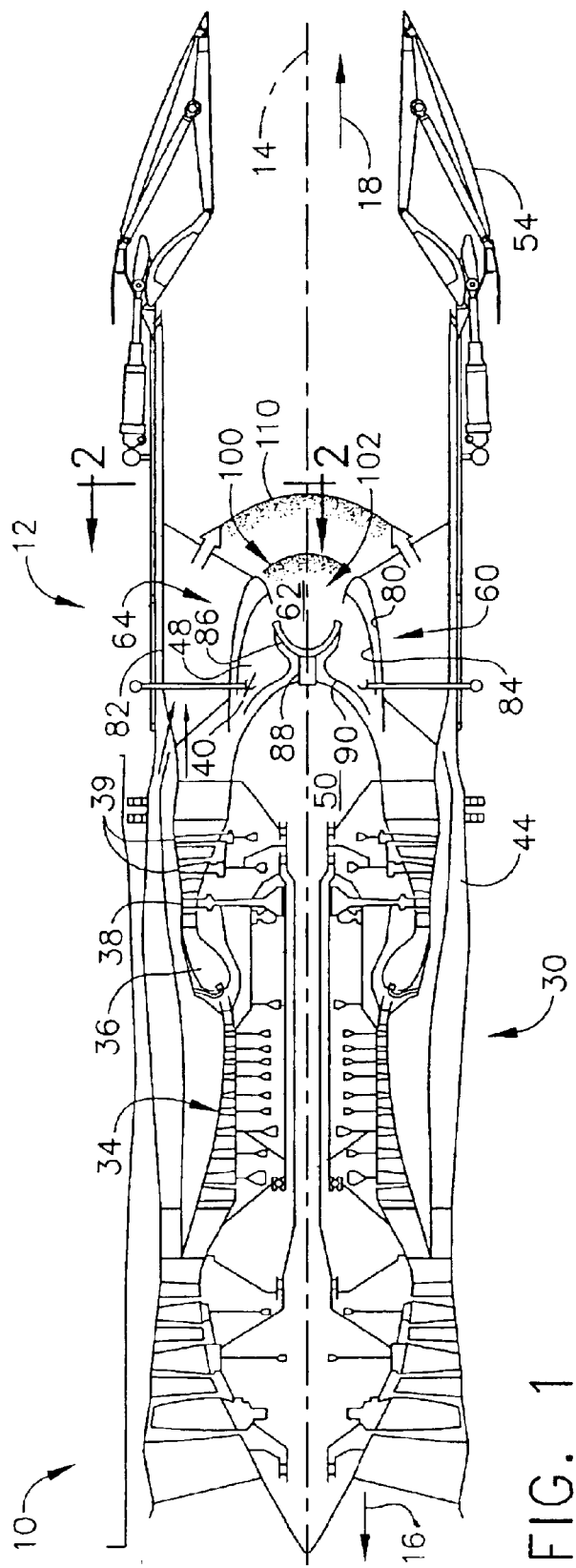
FIG. 1 is a cross-sectional side view of a turbine engine including a pulse detonation system.
Figure 2:
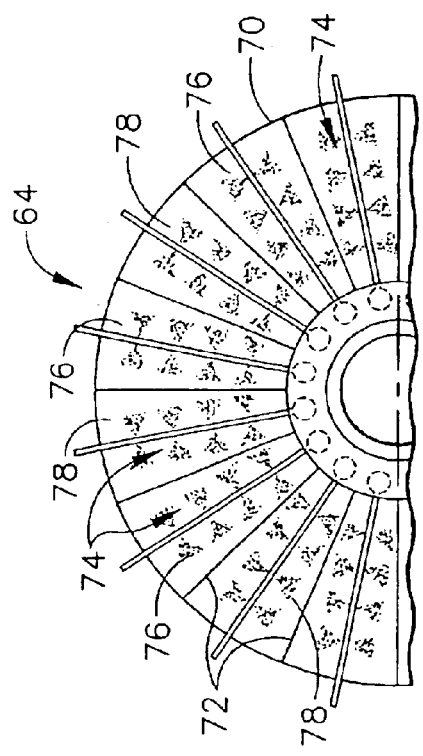
FIG. 2 is a partial cross-sectional view of a portion of the pulse detonation system shown in FIG. 1 and viewed from line 2—2.

FIG. 1 is a cross-sectional side view of a gas turbine engine 10 including a pulse detonation system 12. FIG. 2 is a cross sectional view of a portion of pulse detonation system 12 taken along lines 2—2 shown in FIG. 1. In one embodiment, engine 10 is an F110/129 engine available from General Electric Aircraft Engines, Cincinnati, Ohio. Engine 10 has a generally longitudinally extending axis or centerline 14 extending in a forward direction 16 and an aft direction 18. Engine 10 includes a core engine 30 which includes a high pressure compressor 34, a combustor 36, a high pressure turbine 38, and a power turbine or a low pressure turbine 39 all arranged in a serial, axial flow relationship. Engine 10 also includes a bypass duct 44 that surrounds core engine 30, and enables fluid flow to be routed downstream from core engine 30 rather than through core engine 30. In an alternative embodiment, engine 10 includes a core fan assembly (not shown). An annular centerbody 50 extends downstream from core engine 30.

Pulse detonation system 12 is positioned downstream from core engine 30 such that at least portion of pulse detonation system 12 receives core engine combustion gases discharged from core engine 30 into an inlet 40 of a predetonation chamber 48. Pulse detonation system 12 is positioned upstream from a variable geometry exhaust nozzle 54, such that pulse detonation system 12 creates a temperature rise and a pressure rise within engine 10 without the use of turbomachinery included within core engine 30 to generate thrust from engine 10. Pulse detonation system 12 includes a pulse detonation augmentor 60 that includes predetonation chamber or predetonator 48, a detonation initiator 62 and an annular combustion chamber 64.

In the exemplary embodiment, chamber 64 includes a chuted or daisy mixer 70 that extends circumferentially around centerbody 50 and is radially outward from centerbody 50. Mixer 70 is fabricated with a strutted frame 72 that divides mixer 70 into a plurality of chutes 74 that extend axially through mixer 70. More specifically, chutes 74 include a plurality hot chutes 76 and a plurality of cold chutes 78. Chutes 74 are arranged in an alternating circumferential sequence such that each hot chute 76 is positioned between a pair of circumferentially adjacent cold chutes 78. Hot chutes 76 are sized similarly to cold chutes 78, but are positioned in flow communication with only core engine 10, while cold chutes 78 are positioned in flow communication with bypass duct 44. In the exemplary embodiment, mixer 70 includes eight hot chutes 76 and eight cold chutes 78.

More specifically, chamber 64 extends between a radially inner side 80 and a radially outer side 82. An annular heat shield 84 is coupled to chamber inner side 80 to facilitate shielding chamber 64 from high temperatures generated within predetonation chamber 48 and initial detonation system 62. More specifically, initial detonator 62 is defined radially inwardly from heat shield 84 and downstream from a resonator 86. Resonator 86 is coupled to centerbody 50 by a support member 88 that extends substantially axially downstream from centerbody 50.

An annular liner 90 extends circumferentially around resonator support member 88 and a portion of resonator 86. Accordingly, liner 90 extends axially between centerbody 50 and an upstream side of resonator 86 to facilitate shielding support member 88 and a portion of resonator 86 from high temperatures that may be present within augmenter 60.

During operation, airflow enters engine 10 and fuel is introduced to core engine 30. The air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 39. The core airflow is discharged from low pressure turbine 39 and directed towards pulse detonation system 12.

The core airflow is channeled into pulse detonation system 12 and additional fuel is introduced to the subcomponent predetonation system 48 such that the local less than stoichiometric fuel-air mixture is increased to a fuel-air mixture that is greater than stoichiometric. For the purposes of this application, stoichiometric combustion occurs when substantially all of the oxygen is consumed within the reaction. More specifically, in the exemplary embodiment, during the first stage of augmentor operation, fuel is channeled into predetonator 48 to increase the local fuel-air mixture to approximately twice that of a stoichiometric fuel-air mixture. The fuel-rich mixture is then diluted to a favorable stoichiometry for detonation and is subsequently detonated such that a detonation wave/flamefront 100 is initiated by initial detonator 62 within a throat area 102 defined by heat shield 84. The first stage thrust encompasses the deflagration stage prior to detonation and up to the initiation of detonation.

During a second stage of augmentor operation, additional fuel is supplied to pulse detonation system 12 to transition from dry operation to modulation of reheat operation. Specifically, fuel is supplied to mixer 70 such that the fuel mixes with core engine airflow channeled through hot chutes 76 and also with bypass airflow channeled through cold chutes 78. The fuel-air mixture is discharged from chutes 74 downstream from initial detonator 62. Expansion of detonation wave 100 pressurizes the fuel-air mixture being discharged from mixer 70 into a detonation regime such that the combustion process re-occurs, and the exhaust gases and the fuel-air mixture are reignited, such that a series of pressure waves 110 are created. More specifically, waves 110 propagate aftward at supersonic speeds and compresses hot combustion gases to produce thrust as pressure waves 110 exit pulse detonation system 12. Accordingly, mixer 70 facilitates substantially constant volume combustion within pulse detonation augmentor 60, such that modulated thrust is generated with pulse detonation system 12. Accordingly, modulation of reheat is facilitated through sequencing and staging of pulse detonation system 12, such that augmented thrust is produced from engine 10, while deflagration fuel consumption is facilitated to be minimized.

Figure 3:
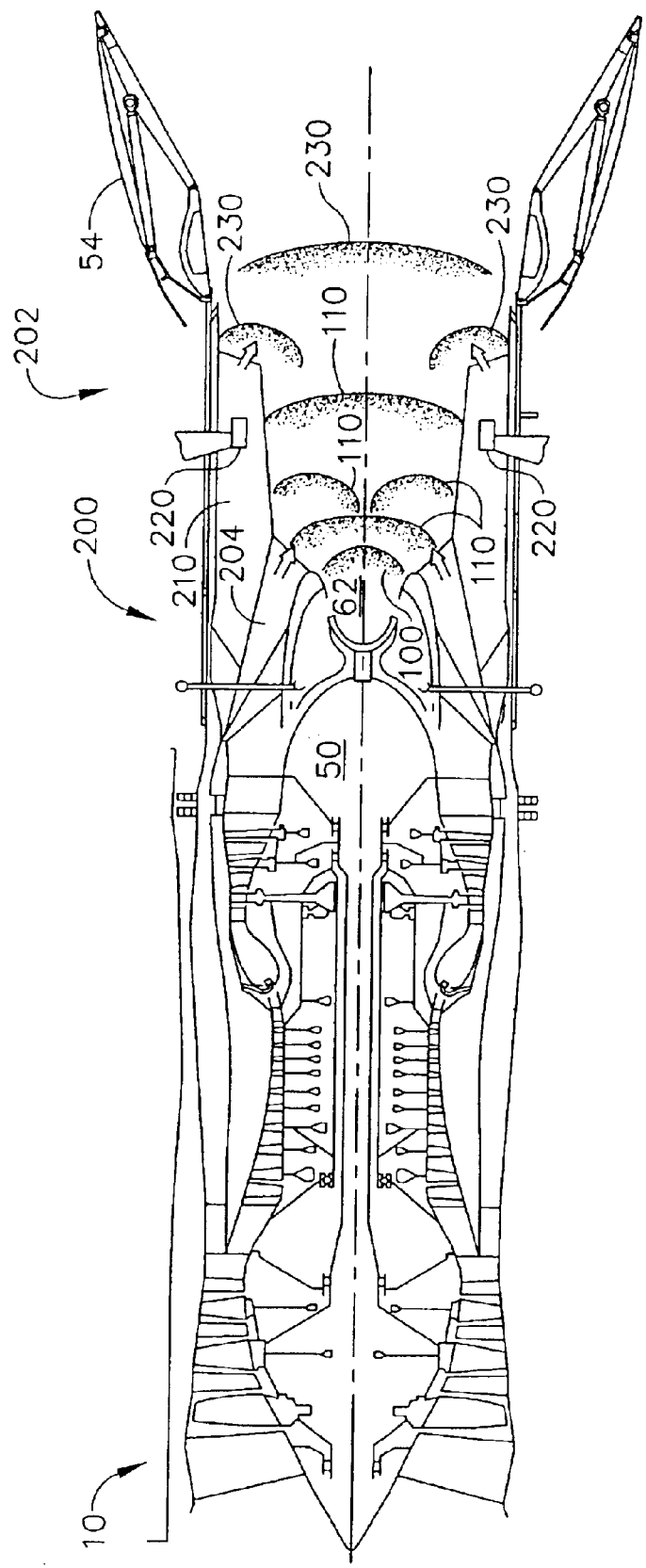
FIG. 3 is a cross-sectional side view of a turbine engine including an alternative embodiment of a pulse detonation system.

FIG. 3 is a cross-sectional side view of turbine engine 10 including an alternative embodiment of a pulse detonation system 200. Pulse detonation system 200 is substantially similar to pulse detonation system 12 (shown in FIGS. 1 and 2) and components of detonation system 200 that are identical to components of pulse detonation system 12 are identified in FIG. 3 using the same reference numerals used in FIGS. 1 and 2. Accordingly, pulse detonation system 200 includes a multi-staged pulse detonation augmentor 202 that includes initial detonator 62 and an annular combustion chamber 204. Annular chamber 204 is substantially similar to chamber 64 (shown in FIG. 1), and includes mixer 70 (shown in FIG. 2), strutted frame 72 (shown in FIG. 2), and chutes 74 (shown in FIG. 2).

Chamber 204 extends circumferentially around centerbody 50 and is radially outward from centerbody 50. A fuel passageway 210 extends circumferentially around chamber 204, such that chamber 204 is positioned radially inwardly from passageway 210. Passageway 210 extends downstream from chamber 204. More specifically, passageway 210 is in flow communication with bypass duct 44 and extends circumferentially around centerbody 50, such that passageway 210 is radially outward from centerbody 50. A plurality of atomized fuel injectors 220 are in flow communication with passageway 210 for injecting atomized fuel into passageway 210, as described in more detail below.

During operation, airflow enters engine 10 and fuel is introduced to core engine 30. The air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 39. The core airflow is discharged from low pressure turbine 39 and directed towards pulse detonation system 12.

The core airflow is channeled into pulse detonation system 200 and additional fuel is introduced to pulse detonation system 200 such that the less than stoichiometric fuel-air mixture is increased to a fuel-air mixture that is greater than stoichiometric. For the purposes of this application, stoichiometric combustion occurs when substantially all of the oxygen is consumed within the reaction. More specifically, in the exemplary embodiment, during the first stage of augmentor operation, fuel is channeled into pulse detonation system 200 to increase the fuel-air mixture to approximately twice that of a stoichiometric fuel-air mixture. The fuel-rich mixture is then detonated such that a detonation wave/ flamefront 100 is initiated by detonator 62 within throat area 102.

During a second stage of augmentor operation, additional fuel is supplied to pulse detonation system 200 to initiate a transition from dry operation to modulation of reheat operation. Specifically, fuel is supplied to mixer 70 such that the fuel mixes with core engine airflow channeled through hot chutes 76 and also with bypass airflow channeled through cold chutes 78. The fuel-air mixture is discharged from chutes 74 downstream from initial detonator 62. Expansion of detonation wave 100 pressurizes the fuel-air mixture being discharged from 70 into a detonation regime such that the combustion process re-occurs, and the exhaust gases and the fuel-air mixture are reignited, such that a series of pressure waves 110 are created. More specifically, waves 110 propagate aftward at supersonic speeds and compresses hot combustion gases to produce thrust as pressure waves 110 exit pulse detonation system 12.

During a subsequent stage of augmentor operation, variable geometry exhaust nozzle 54 is opened and additional fuel is supplied to passageway 210 through fuel injectors 220. Opening nozzle 54 facilitates transfering a sonic throat from a throat defined within nozzle 54 upstream to adjacent passageway 210. The fuel is mixed with fluid flow discharged from bypass duct 44 and the fuel-air mixture is discharged from passageway 210 downstream from chamber 204. Expansion of pressure waves 110 pressurizes the fuel-air mixture being discharged from passageway 210 into a detonation regime such that the combustion process re-occurs, and the exhaust gases and the fuel-air mixture are reignited, creating a series of pressure waves 230. More specifically, waves 110 propagate aftward to produce modulated thrust from engine 10. Alternatively, a series of additional stages of augmentor operation are used to produce additional modulated thrust from engine 10.

The above-described pulse detonation system includes at least one pulse detonation augmentor which produces additional engine thrust without the use of turbomachinery. More specifically, the pulse detonation augmentor is multi-staged such that modulation of reheat is accomplished through sequencing and staging of the pulse detonation augmentor. As a result, engines using the pulse detonation system obtain increased thrust and modulated thrust which permits an engine to operate with a high efficiency and increased performance over a wide range of operating flight speeds.

Exemplary embodiments of pulse detonation systems are described above in detail. The systems are not limited to the specific embodiments described herein, but rather, components of each specific pulse detonation system may be utilized independently and separately from other components described herein. For example, each pulse detonation augmentor component can also be used in combination with other pulse detonation augmentor components and other configurations of pulse detonation systems.

While the invention has been described in terms of various specific embodiments, those skilled in the art will recognize that the invention can be practiced with modification within the spirit and scope of the claims.

What is claimed is:

1. A method for generating thrust from a gas turbine engine using a pulse detonation system, the engine including an inlet portion and an exhaust portion, the pulse detonation system including a multi-staged pulse detonation augmentor including a predetonator, said method comprising:

supplying a less than stoichiometric fuel/air mixture to the pulse detonation system during a first operating stage;

detonating the fuel/air mixture with the predetonator to increase the temperature and pressure within the engine and to generate engine thrust; and supplying additional fuel and air to the augmentor during a second operating stage.

2. A method in accordance with claim 1 wherein the engine also includes a core engine and a bypass duct, said supplying additional fuel and air to the pulse detonation system comprises supplying additional fuel and air to the augmentor through an annular chamber positioned downstream from the core engine.

3. A method in accordance with claim 1 wherein the engine also includes a core engine and a bypass duct, said supplying additional fuel and air to the augmentor comprises supplying additional fuel and air to the pulse detonation system through a annular chamber positioned downstream from the core engine such that a plurality of chutes defined within the annular chamber receive fluid flow discharged from the core engine, and such that a plurality of chutes defined within the annular chamber received fluid flow discharged from the bypass duct.

4. A method in accordance with claim 1 wherein supplying additional fuel and air to the augmentor during a second operating stage comprises supplying additional fuel to the augmentor through a plurality of fuel atomizing spray nozzles.

5. A method in accordance with claim 1 further comprising adjusting a relative position of a variable exhaust nozzle to facilitate enhanced thrust production by the pulse detonation system.

6. A pulse detonation system for a gas turbine engine including a core engine, said pulse detonation system downstream from the core engine and configured to create a temperature rise and a pressure rise within the gas turbine engine and to increase engine thrust, said pulse detonation system comprising a multi-staged pulse detonation augmentor comprising a predetonator operable with at least a first operating stage wherein a less-than-stoichiometric fuel-air mixture is provided to said predetonator.

7. A pulse detonation system in accordance with claim 6 wherein said augmentor further operable with at least a second operating stage during which a stoichiometric fuel-air mixture is provided to said augmentor.

8. A pulse detonation system in accordance with claim 6 wherein said augmentor facilitates producing modulated thrust from the gas turbine engine.

9. A pulse detonation system in accordance with claim 6 wherein the gas turbine engine includes centerbody extending aftward from the core engine, said pulse detonation augmentor further comprises an annular combustion chamber extending circumferentially around the engine centerbody.

10. A pulse detonation system in accordance with claim 9 wherein said annular combustion chamber is radially outwardly from the engine centerbody and comprises a plurality of axial chutes.

11. A pulse detonation system in accordance with claim 9 wherein said annular combustion chamber comprises a plurality of first axial chutes and a plurality of second axial chutes, said first axial chutes in flow communication with fluid flow exiting the core engine, said second axial chutes in flow communication with fluid flow bypassing the core engine.

12. A pulse detonation system in accordance with claim 11 wherein each said first axial chute is between a pair of circumferentially adjacent second axial chutes.

13. A pulse detonation system in accordance with claim 11 wherein said pulse detonation augmentor further comprises a plurality of fuel atomizing spray nozzles for supplying fuel downstream from the core engine.

14. A gas turbine engine comprising:

an inlet portion;

an exhaust portion positioned co-axially with said inlet portion; and a pulse detonation system positioned between said inlet and exhaust portions, said pulse detonation system configured to create a temperature rise and a pressure rise within said engine and to increase engine thrust, said pulse detonation system comprising a multi-staged pulse detonation augmentor comprising a predetonator that is operable with at least a first operating stage wherein a less-than-stoichiometric fuel-air mixture is provided to said augmentor.

15. A gas turbine engine in accordance with claim 14 further comprising a core engine configured to power said engine, and a by-pass duct to channel flow around said core engine, said pulse detonation system downstream from said core engine such that said pulse detonation system is in flow communication with said bypass duct and said core engine.

16. A gas turbine engine in accordance with claim 15 further comprising a centerbody extending aftward from said core engine, said pulse detonation augmentor further comprises an annular combustion chamber extending circumferentially around said engine centerbody.

17. A gas turbine engine in accordance with claim 16 wherein said annular combustion chamber comprises a plurality of first axial chutes and a plurality of second axial chutes, said first axial chutes in flow communication with said core engine, said second axial chutes in flow communication with said bypass duct.

18. A gas turbine engine in accordance with claim 15 further comprising a variable exhaust nozzle downstream from said pulse detonation system.

19. A gas turbine engine in accordance with claim 15 wherein said pulse detonation augmentor further comprises a plurality of fuel atomizing spray nozzles for supplying fuel to said pulse detonation system.

20. A gas turbine engine in accordance with claim 15 wherein said augmentor facilitates producing modulated thrust from said gas turbine engine.

* * * * *